US012404996B2

(12) United States Patent
Morales et al.

(10) Patent No.: US 12,404,996 B2
(45) Date of Patent: *Sep. 2, 2025

(54) LED CIRCUIT BOARD LAYOUT FOR LOW PROFILE LIGHTING FIXTURE

(71) Applicant: Progress Lighting, LLC, Greenville, SC (US)

(72) Inventors: Luis Morales, Fountain Inn, SC (US); Thomas Warren Weeks, Jr., Simpsonville, SC (US)

(73) Assignee: PROGRESS LIGHTING, LLC, Greenville, SC (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/489,194

(22) Filed: Sep. 29, 2021

(65) Prior Publication Data

US 2022/0018527 A1 Jan. 20, 2022

Related U.S. Application Data

(63) Continuation of application No. 17/173,807, filed on Feb. 11, 2021, now Pat. No. 11,143,391, which is a (Continued)

(51) Int. Cl.
*F21V 23/00* (2015.01)
*F21S 8/00* (2006.01)
(Continued)

(52) U.S. Cl.
CPC .............. *F21V 23/005* (2013.01); *F21S 8/03* (2013.01); *F21V 19/0015* (2013.01); (Continued)

(58) Field of Classification Search
CPC .... F21S 8/00; F21S 8/03; F21V 19/00; F21V 19/001; F21V 19/0015; F21V 23/00; (Continued)

(56) References Cited

U.S. PATENT DOCUMENTS 8,246,203 B2 * 8/2012 Hancock ............... F21V 23/002 362/249.02
8,596,837 B1 * 12/2013 Wronski ............. F21V 19/0055 362/249.02

(Continued)

FOREIGN PATENT DOCUMENTS

WO WO-2015022015 A1 * 2/2015 ............ F21V 17/101

*Primary Examiner* — Jason M Han
(74) *Attorney, Agent, or Firm* — Brooks Kushman P.C.

(57) ABSTRACT

Light emitting device (LED) circuit board layouts for low profile lighting fixtures are provided. In some embodiments, the lighting fixture can include a fixture housing. The lighting fixture can include one or more LED devices disposed on a circuit board. The lighting fixture can include one or more electronic components associated with at least one of a driver circuit or a filter circuit (e.g., as part of a flicker reducing circuit) disposed on the circuit board. The one or more LED devices are disposed on a first portion of the circuit board and the electronic components are disposed on a second portion of the circuit board. The second portion of the circuit board can be spaced radially apart from a center point of the circuit board relative to the first portion.

20 Claims, 5 Drawing Sheets

Related U.S. Application Data continuation of application No. 16/792,361, filed on Feb. 17, 2020, now Pat. No. 10,928,048, which is a continuation of application No. 15/817,334, filed on Nov. 20, 2017, now Pat. No. 10,563,851.

(60) Provisional application No. 62/425,137, filed on Nov. 22, 2016.

(51) Int. Cl.

| | |
|---|---|
| ***F21S 8/04*** | (2006.01) |
| ***F21V 15/01*** | (2006.01) |
| ***F21V 19/00*** | (2006.01) |
| ***F21V 21/08*** | (2006.01) |
| ***F21V 29/70*** | (2015.01) |
| ***F21V 31/00*** | (2006.01) |
| ***F21Y 105/18*** | (2016.01) |
| ***F21Y 115/10*** | (2016.01) |
| ***H05B 45/40*** | (2020.01) |
| ***H05B 45/59*** | (2022.01) |

(52) U.S. Cl.
CPC ............ *H05B 45/40* (2020.01); *H05B 45/59* (2022.01); *F21S 8/033* (2013.01); *F21S 8/04* (2013.01); *F21V 15/01* (2013.01); *F21V 21/08* (2013.01); *F21V 29/70* (2015.01); *F21V 31/005* (2013.01); *F21Y 2105/18* (2016.08); *F21Y 2115/10* (2016.08)

(58) Field of Classification Search
CPC .... F21V 23/003; F21V 23/004; F21V 23/005; F21V 29/00; F21V 29/50; F21V 29/70; F21Y 2115/10; H05B 33/0821; H05B 45/40; H05B 45/50
See application file for complete search history.

(56) References Cited

U.S. PATENT DOCUMENTS

| | | | | |
|---|---|---|---|---|
| 8,716,943 | B2 * | 5/2014 | Oyaizu .................. | H05B 45/00 315/294 |
| 8,899,789 | B2 * | 12/2014 | Chung .................. | F21V 19/003 362/255 |
| 9,273,838 | B2 * | 3/2016 | Tanaka .................... | F21V 29/89 |

* cited by examiner

LED CIRCUIT BOARD LAYOUT FOR LOW PROFILE LIGHTING FIXTURE

PRIORITY CLAIM

The present application is a continuation of U.S. patent application Ser. No. 17/173,807, filed Feb. 11, 2021, which is a continuation of U.S. patent application Ser. No. 16/792,361, filed Feb. 17, 2020, which is a continuation of U.S. patent application Ser. No. 15/817,334, filed Nov. 20, 2017, which is based on and claims the benefit of priority of U.S. Provisional Patent Application No. 62/425,137, filed Nov. 22, 2016, the disclosures of which are incorporated herein by reference in their entirety.

FIELD

The present subject matter relates generally to lighting fixtures.

BACKGROUND

Lighting fixtures can be used for providing lighting for a space, such as a building or room. Light emitting diode (LED) devices and other solid state devices are becoming increasingly used in many lighting applications and have been integrated into a variety of lighting fixtures. Use of LED light sources in lighting fixtures can provide increased efficiency, life and durability, can produce less heat, and can provide other advantages relative to traditional incandescent and fluorescent lighting systems. Moreover, the efficiency of LED light sources has increased such that higher power can be provided at lower cost to the consumer.

The use of LED light sources has allowed for the provision of "low profile" light sources. These low profile light sources can be surface mounted to a ceiling or other surface adjacent to a junction box or can housing of a can lighting fixture. The shallow depth of the low profile lighting fixtures can reduce the intrusion of the lighting fixture from the surface into the space. To accommodate their shallow depth, low profile lighting fixtures often include a single circuit board that includes both the LED devices as well as other electronic components for driver circuits used to power the LED devices.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a lighting fixture. The lighting fixture can include a fixture housing. The fixture housing can be associated with a depth dimension and a length dimension. A ratio of the depth dimension to the length dimension can be, for instance, about 0.25 or less. The lighting fixture can further include one or more LED devices disposed on a circuit board. The lighting fixture can include one or more electronic components associated with a filter circuit disposed on the circuit board. The one or more LED devices are disposed on a first portion of the circuit board and the one more electronic devices are disposed on a second portion of the circuit board. The second portion of the circuit board can be spaced radially apart from a center point of the circuit board relative to the first portion.

Another example aspect of the present disclosure is directed to a surface mount, low profile lighting fixture. The lighting fixture includes a fixture housing configured to be surface mounted to a surface. The fixture housing can be associated with a depth dimension and a length dimension. A ratio of the depth dimension to the length dimension can be, for instance, about 0.25 or less. The lighting fixture can further includes a driver circuit. The lighting fixture can further include a flicker reducing circuit. The lighting fixture can further include one or more LED devices. The driver circuit, flicker reducing circuit, and the one or more LED devices can be disposed on the same circuit board. The one or more LED devices can disposed on a center portion of the circuit board. One or more electronic components associated with the driver circuit and the flicker reducing circuit can be disposed on a peripheral portion of the circuit board. The second portion can be located on the circuit board relative to the first portion of the circuit board such that the one or more electronic components associated with the driver circuit and the flicker reducing circuit do not interfere with light emitted from the one or more LED devices disposed on the first portion.

Other example aspects of the present disclosure are directed to systems, methods, devices, circuits and apparatus associated with low profile lighting fixtures.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
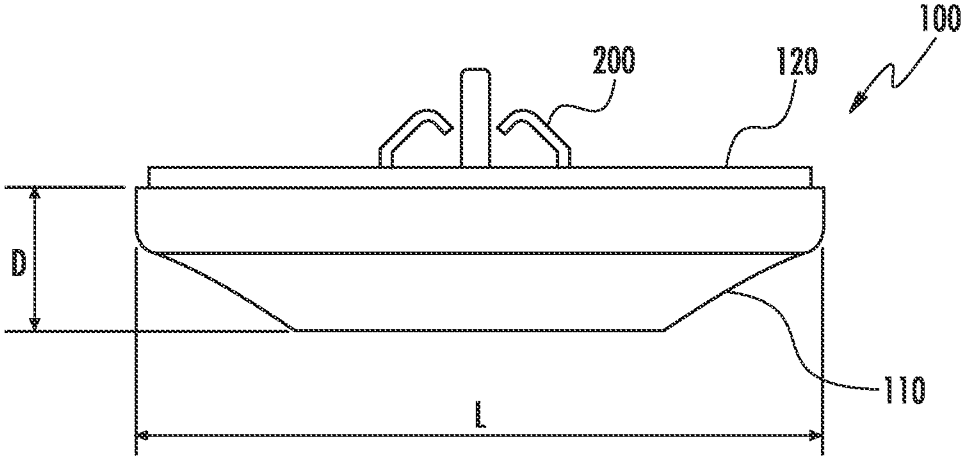
FIG. 1 depicts a side view of an example lighting fixture according to example embodiments of the present disclosure.
Figure 2:
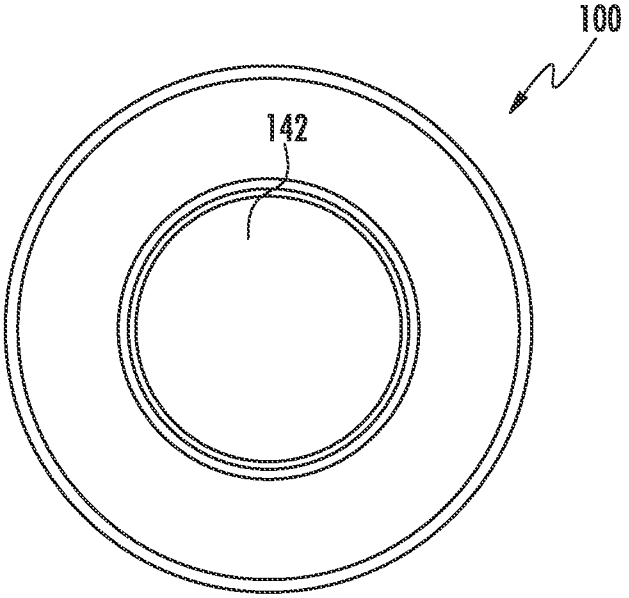
FIG. 2 depicts a bottom view of an example lighting fixture according to example embodiments of the present disclosure.
Figure 3:
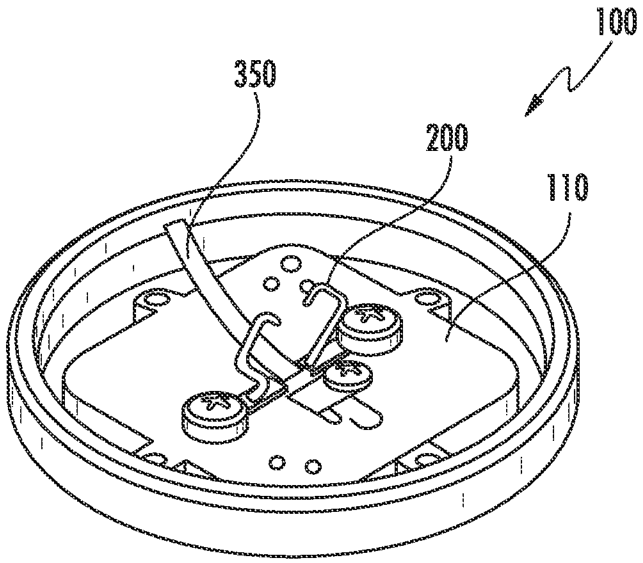
FIG. 3 depicts a perspective view of a top portion of an example lighting fixture according to example embodiments of the present disclosure.
Figure 4:
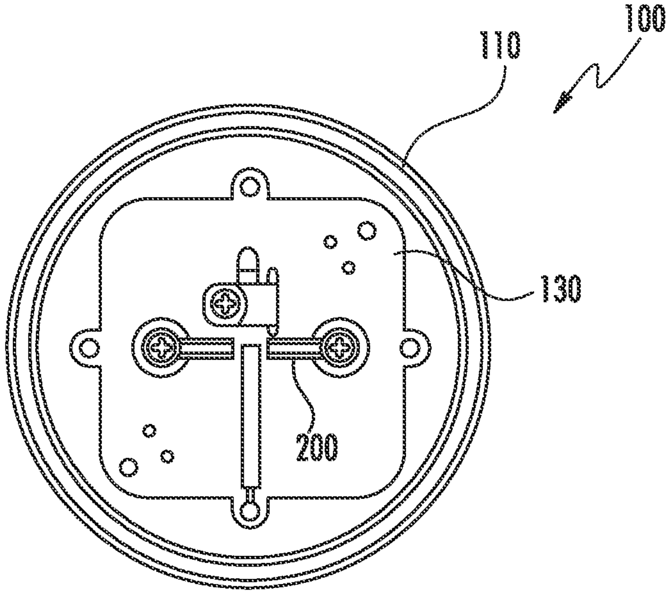
FIG. 4 depicts a top view of a top portion of an example lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed low profile lighting fixtures having one or more light emitting diode (LED) devices. An example low profile lighting fixture can be configured to be surface mounted to a surface (e.g., a ceiling or a wall) in a manner that covers a junction box or a recessed can housing. The low profile lighting fixture can have a circuit board having the one or more light emitting diode (LED) devices or other light sources. The circuit board can further include electronic components for providing and/or conditioning power to the LED devices, including larger electronic components associated with, for instance, a filter circuit and/or a flicker reducing circuit. In some embodiments, all of the electronic components and LED devices associated with the low profile lighting fixture are disposed on the same circuit board. According to example aspect of the present disclosure, the electronic components for providing and/or conditioning power to the LED devices can be arranged on the circuit board relative to the LED devices in a manner that reduces shadowing effects when the LED devices become illuminated, providing a more uniform output of light from the lighting fixture.

For example, in some embodiments, a lighting fixture can include a fixture housing. The fixture housing can be circular in shape, rectangular in shape, square in shape, or can have other suitable shapes. The fixture housing can have a length dimension (e.g., a long dimension in the case of a rectangular shape, a diameter in the case of a circular shape, etc.). The fixture housing can also have a depth dimension. The depth dimension can be indicative of how far the lighting fixture extends from a surface when the lighting fixture is mounted to the surface. In some embodiments, a ratio of the length dimension to the depth dimension is about 0.25 or less. As used herein, the use of the term "about" in conjunction with a numerical value is intended to refer to within 25% of the stated numerical value.

The lighting fixture can include a single circuit board (e.g., a circuit board associated with a light engine) that includes a plurality of LED devices and a plurality of electronic components for providing and/or conditioning power or the LED devices. For instance, the electronic components can be associated with a driver circuit and/or a filter circuit. In some embodiments, the filter circuit can be associated with a flicker reducing circuit. The flicker reducing circuit can include one or more capacitors for filtering power signals for driving the LED devices.

According to particular aspects of the present disclosure, the LED devices can be located on a first portion of the circuit board and the one or more electronic components can be located on a second portion of the circuit board that is separated from the first portion of the circuit board. For instance, in some embodiments, the second portion of the circuit board can be spaced radially apart from a center point on the circuit board relative to the first portion. In some embodiments, the second portion of the circuit board can at least partially surround the first portion of the circuit board. In some embodiments, the first portion of the circuit board can be located at a center portion of the circuit board and the second portion of the circuit board can be located at a peripheral portion of the circuit board. In some embodiments, none of the electronic components associated with the driver circuit and/or filter circuit are located in the first portion of the circuit board.

By separating the electronic components associated with the driver circuit, filter circuit, and/or flicker reducing circuit from the LED devices on the circuit board, the LED devices can provide illumination (e.g., as a result of electrons moving through a semiconductor material) without interference from the electronic components with the light output from the LED devices. In this way, potential shadows that may have resulted from the one or more electronic components, particularly larger electronic components (e.g., capacitors) associated with, for instance, a flicker reducing circuit can be reduced.

FIGS. 1-5 depict an example lighting fixture 100 according to example embodiments of the present disclosure. The lighting fixture 100 can be a surface mount, low profile lighting fixture. For instance, the lighting fixture 100 can include a fixture housing 110. The fixture housing 110 can be adapted to be surface mounted to a ceiling, wall, or other surface.

The fixture housing 110 illustrated in FIGS. 1-5 is generally circular in shape. Those of ordinary skill in the art, using the disclosures provided herein, will understand that the lighting fixture 100 can have other shapes without deviating from the scope of the present disclosure, such as rectangular shape, a square shape, a triangular shape, a polygonal shape, etc.

The fixture housing 110 can include a length dimension L and a width dimension D. The length dimension L can be, for instance, the diameter of a generally circular lighting fixture as shown in FIG. 1. The length dimension L can also be a dimension associated with a line that passes through a center point of the fixture housing 110 and having ends on a peripheral portion of the fixture housing 110.

The depth dimension D can be associated with a distance from a top portion of the fixture housing 110 to a bottom portion of the fixture housing 110 when the fixture housing is oriented as shown in FIG. 1. The depth dimension D can represent a distance that the fixture housing 110 extends from a surface to which the lighting fixture 100 is mounted.

According to example embodiments of the present disclosure, the lighting fixture 100 can be a low profile lighting fixture such that the depth dimension does not extend a far distance from the surface to which it is mounted. In some embodiments, a ratio of the depth dimension D to the length dimension L can be about 0.25 or less, such as about 0.18 or less.

The lighting fixture 100 can include a spring clip 200 that can engage a bracket 210 in order to surface mount the lighting fixture 100 to a surface such as a ceiling or other surface. For instance, the bracket 210 can be secured to a junction box recessed within a ceiling. The spring clip 200 can engage the bracket 210 (e.g., by being inserted through an opening in the bracket 210) to retain the fixture 100 adjacent the surface. Other suitable mounting techniques can be used without deviating from the scope of the present disclosure.

The lighting fixture 100 can include, for instance, a waterproof gasket 120. The waterproof gasket 120 can provide a seal between a surface to which the lighting fixture 100 is mounted and the fixture housing 110 so that moisture, water, and/or other elements are prevented from entering the interior of the fixture housing 110. In this way, internal components (e.g., circuit board 300) can be protected from damage from external sources.

The lighting fixture can include a silicone (e.g., silicone rubber) ring 125 and a lens 142. The lens 142 can be used to protect internal components of the lighting fixture (e.g., circuit board 300) and/or to condition light emitted from one or more LED devices mounted on circuit board 300 to provide a desired light output for the lighting fixture 100. The lens 142 can be, for instance, a glass, polycarbonate, acrylic, or silicone lens (with or without UV protection) or other suitable lens.

Figure 5:
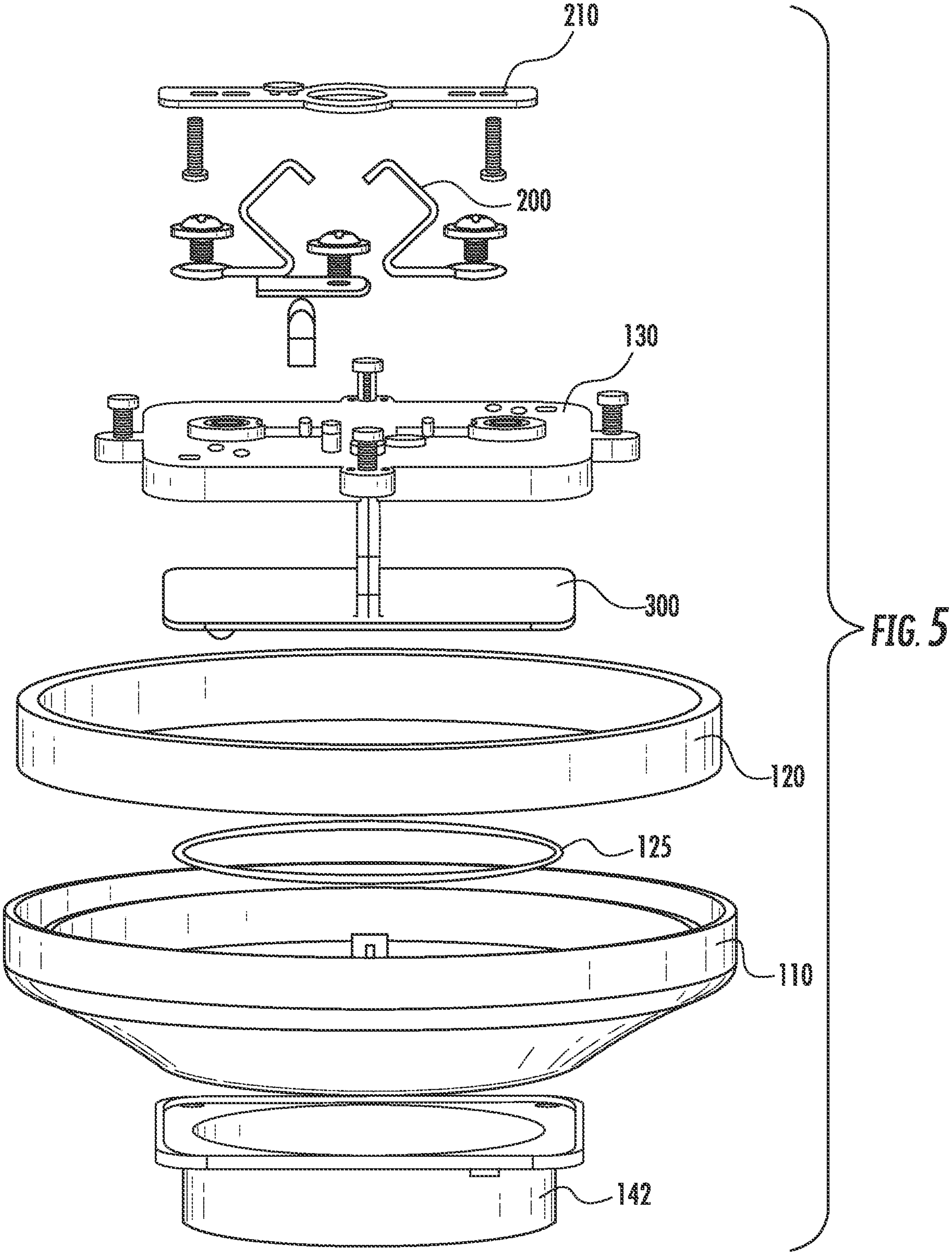
FIG. 5 depicts a top view of a top portion of an example lighting fixture according to example embodiments of the present disclosure.

As shown in FIG. 5, the lighting fixture 100 can include a circuit board 300 having one or more LED devices as light sources for the lighting fixture 100. The circuit board 300 can be mounted on a heat sink 130 that is configured to transfer heat away from the circuit board 300. The heat sink 130 can be formed from any suitable heat conducting material, such as a metal material.

The circuit board 300 can be associated with a light engine that includes all of the necessary electronic components for powering the one or more LED devices located on the circuit board 300. For instance, the circuit board 300 can include one or more electronic components associated with a driver circuit configured to convert an input power (e.g., an input 120 V AC power) to a suitable DC power for driving the LED devices. In some embodiments, the driver circuit can be a dimmable driver circuit. The driver circuit can include various components, such as switching elements (e.g. transistors) that are controlled to provide a suitable driver output. For instance, in some embodiments, the driver circuit can include one or more transistors. Gate timing commands can be provided to the one or more transistors to convert the input power to a suitable driver output using pulse width modulation techniques In addition, the circuit board 300 can include electronic components (e.g., semiconductor chips, capacitors, etc.) associated with a filter circuit used as part of, for instance, a flicker reducing circuit. The filter circuit can smooth power signals provided from the driver circuit so that light flicker in light emitted from the LED devices on the circuit board 300 is reduced. In some embodiments, a flicker reducing circuit can include one or more capacitors that are used to smooth the driver output of a driver circuit implemented on the circuit board 300. In some embodiments, a flicker reducing circuit can include one or more integrated circuit chips (e.g., application specific integrated circuits) that control various electronic components (e.g., transistors) based on input signals from the driver circuit to reduce light flicker in light emitted from the LED devices on the circuit board 300.

In some embodiments, the electronic components associated with a driver circuit and a flicker reducing circuit are located on the same circuit board 300 so that only one circuit board has to be included in the lighting fixture 100. This can allow for the fixture housing 110 to have a reduced depth relative to housings configured to accommodate multiple circuit boards, allowing the lighting fixture 100 to be more easily implemented as a low profile lighting fixture.

Figure 6:
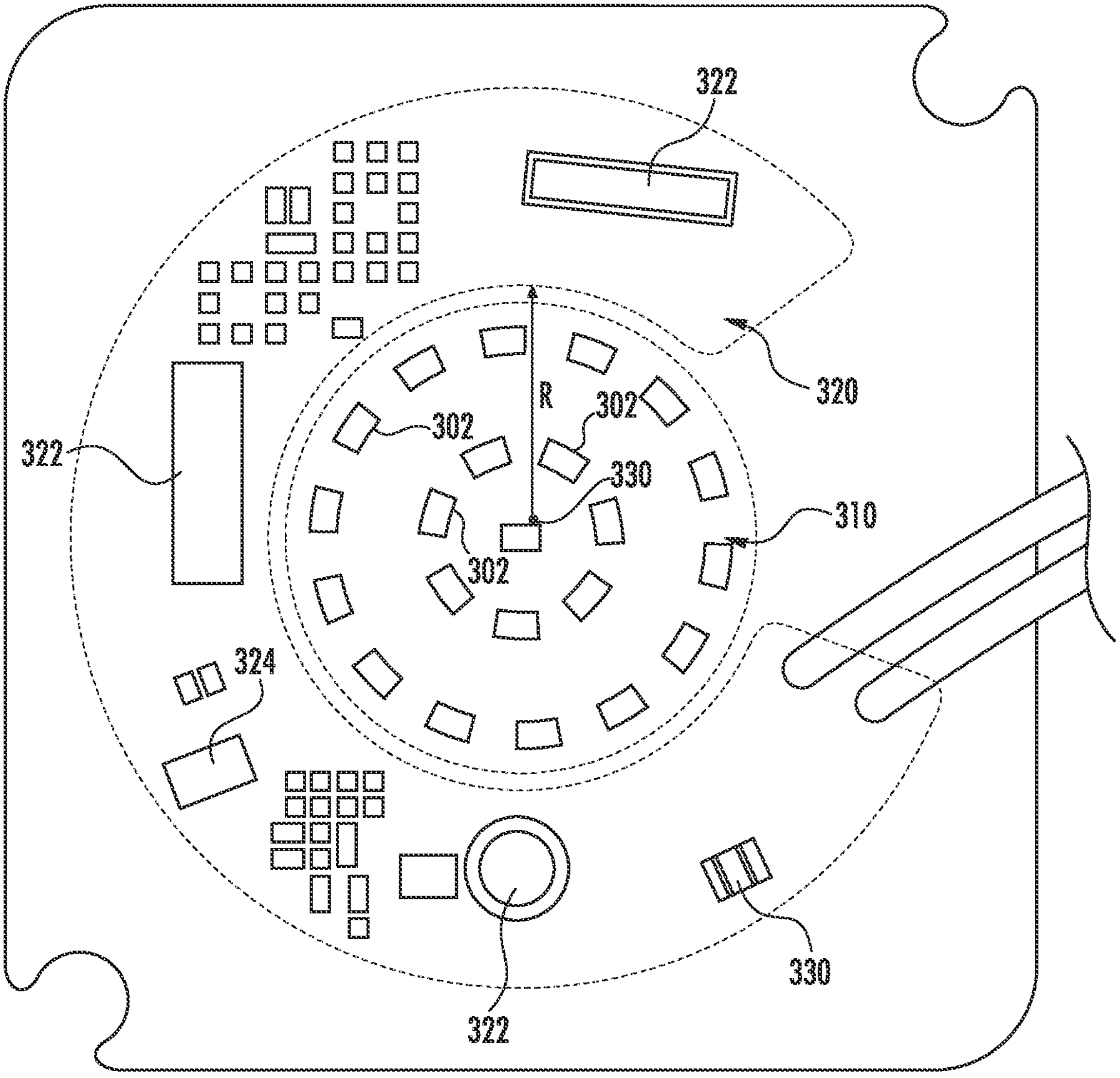
FIG. 6 depicts an exploded view of example lighting fixture according to example embodiments of the present disclosure.

FIG. 6 depicts an example circuit board layout for circuit board 300 according to example embodiments of the present disclosure. As shown, the circuit board 300 includes a plurality of LED devices 302. The LED devices 302 are arranged as a circular array in a first portion 310 of the circuit board 300. The circuit board 300 also includes electronic components for providing and conditioning power to the plurality of LED devices 302. For instance, the circuit board 300 can include electronic components associated with a driver circuit and one or more filter circuits (e.g., including one or more capacitors). The filter circuit(s) can be associated with, for instance, a flicker reducing circuit for reducing flicker in the light output of the LED devices 302.

Figure 7:
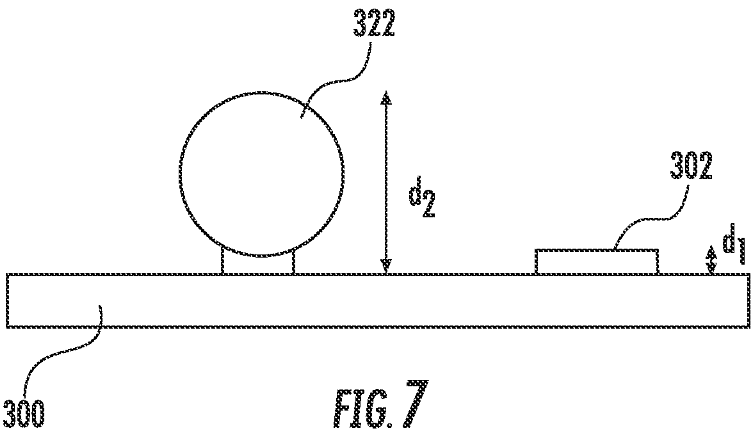
FIG. 7 depicts an example circuit board layout for LED circuit board to be used in an example lighting fixture according to example embodiments of the present disclosure.

As shown in FIG. 6, the electronic components can include, for instance, a fuse 330, capacitors 322, integrated circuits 324, and other electronic components. Certain of the electronic components can be bulky components that extend a greater distance from the circuit board 300 relative to the LED devices 302. For instance, as shown in FIG. 7, an LED device can extend a first distance $d_1$ from the circuit board 300. A capacitor 322 associated with, for instance, a flicker reducing circuit can extend a distance $d_2$ from the circuit board. The distance $d_2$ can be greater than the distance $d_1$, such as at least two times greater than the distance $d_1$, such as at least four times greater than the distance $d_1$, such as at least ten time greater than the distance $d_1$.

Referring to FIG. 6, the electronic components associated with driver circuit and flicker reducing circuit can be located in a second portion 320 of the circuit board. The second portion 320 of the circuit board 300 can be disposed in a completely separate location of the circuit board 300 relative to the first portion 310 of the circuit board 300 such that none of the electronic components associated with the driver circuit or the flicker reducing circuit are located in the first portion 310 of the circuit board 300. In the example of FIG. 6, the first portion 310 of the circuit board 300 can be located in a center portion of the circuit board 300. The second portion of the circuit board 300 can be located in a peripheral portion of the circuit board 300.

As shown in FIG. 6, the second portion 320 of the circuit board 300 is spaced radially apart in the radial direction R from a center point 330 on the circuit board 300. As used herein, the term "spaced radially apart" is not limited to generally circular structures but can refer to being spaced away from a central portion of the circuit board 300 towards a peripheral portion of the circuit board 300 irrespective of the shape of the circuit board 300. As shown in FIG. 6, the second portion 320 of the circuit board at least partially surrounds the first portion 310 of the circuit board 300 such that the electronic components associated with the driver circuit and/or filter circuit at least partially surround the circular array of LED devices 302.

In this way, the electronic components (e.g., fuse 330, capacitors 322, integrated circuit 324, and other components) associated with the driver circuit and the flicker reducing circuit can be positioned on the circuit board 330 at a location that does not interfere with light emitted from the LED devices 302. This can reduce shadowing effects in the light output from the lighting fixture 100 that may result from certain electronic components of the flicker reducing circuit or driver circuit (e.g., one or more capacitors) that can extend a greater distance from the circuit board 300 relative to the LED devices.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light engine for a lighting fixture comprising: a circuit board having a central portion and a peripheral portion;

one or more LEDs disposed on the central portion of the circuit board, the one or more LEDs extending a first distance from the circuit board;

a driver circuit disposed on the peripheral portion of the circuit board, the driver circuit configured to receive an AC input and provide a DC output; and a filter circuit disposed on the peripheral portion of the circuit board, the filter circuit comprising one or more capacitors, the one or more capacitors extending a second distance from the circuit board, wherein the second distance is configured to be at least two times greater than the first distance and wherein the one or more LEDs are positioned on the central portion from the filter circuit disposed on the peripheral portion to eliminate a shadowing effect in light emitted from the one or more LED devices.

2. The light engine of claim 1, wherein the output of the driver circuit is provided to the one or more capacitors.

3. The light engine of claim 2, wherein the driver circuit is a dimmable driver circuit.

4. The light engine of claim 1, wherein the second distance is greater than the first distance by one of: four times the first distance or ten times the first distance.

5. The light engine of claim 1, further comprising a fuse positioned on the circuit board.

6. The light engine of claim 1, wherein the filter circuit includes an integrated circuit chip.

7. The light engine of claim 1, wherein at least one of the driver circuit and the filter circuit partially surrounds the LEDs.

8. The light engine of claim 7, wherein the one or more LEDs include a plurality of LEDs positioned on the circuit board in a circular array.

9. The light engine of claim 1, wherein the filter circuit is associated with a flicker reducing circuit.

10. The light engine of claim 1, wherein the driver circuit includes a transistor.

11. The light engine of claim 1, wherein the circuit board is mounted to a heat sink.

12. A light engine for a lighting fixture comprising: a circuit board positioned in a housing;

one or more LEDs disposed on a central portion of the circuit board, the one or more LEDs extending a first distance from the circuit board;

a driver circuit disposed on a peripheral portion of the circuit board, the driver circuit configured to receive an AC input and produce a DC output; and a filter circuit disposed on the peripheral portion of the circuit board, the filter circuit comprising one or more capacitors extending a second distance from the circuit board, the second distance is configured to be at least two times greater than the first distance, wherein the second distance is further configured to be spaced from the first distance to eliminate a shadowing effect in light emitted from the one or more LEDs.

13. The light engine of claim 12, wherein the output of the driver circuit is provided to the one or more capacitors.

14. The light engine of claim 12, wherein the driver circuit includes a transistor.

15. The light engine of claim 12, wherein the driver circuit is a dimmable driver circuit.

16. The light engine of claim 12, wherein the second distance is greater than the first distance by one of: four times the first distance or ten times the first distance.

17. The light engine of claim 12, wherein the filter circuit is spaced radially apart from the central portion of the circuit board.

18. The light engine of claim 12, wherein the peripheral portion extends at least 180 degrees radially around the central portion.

19. The light engine of claim 12, wherein the output of the driver circuit is provided to the one or more capacitors.

20. The light engine of claim 12, wherein the circuit board is mounted to a heat sink.

* * * * *